(12) United States Patent
Lombard et al.

(10) Patent No.: US 11,401,948 B2
(45) Date of Patent: Aug. 2, 2022

(54) TURBOCHARGER COMPRESSOR WITH INLET-ADJUSTMENT MECHANISM HAVING PIVOTING BLADES FORMING ADJUSTABLE UNINTERRUPTED BLADE RING

(71) Applicant: Garrett Transportation I Inc., Torrance, CA (US)

(72) Inventors: Alain Lombard, Chavelot (FR); Hani Mohtar, Pirey (FR); Dominique Colombier, Cheniménil (FR); Stephane Pees, Heillecourt (FR); Renaud Blaise, Les Forges (FR)

(73) Assignee: Garrett Transportation I Inc., Torrance, CA (US)

( * ) Notice: Subject to any disclaimer, the term of this patent is extended or adjusted under 35 U.S.C. 154(b) by 38 days.

(21) Appl. No.: 17/247,511

(22) Filed: Dec. 15, 2020

(65) Prior Publication Data
US 2022/0186747 A1 Jun. 16, 2022

(51) Int. Cl.
*F04D 29/46* (2006.01)
*F02C 6/12* (2006.01)

(52) U.S. Cl.
CPC .............. *F04D 29/464* (2013.01); *F02C 6/12* (2013.01); *F05D 2220/40* (2013.01); *F05D 2250/232* (2013.01); *F05D 2250/51* (2013.01)

(58) Field of Classification Search
CPC ...... F04D 29/464; F02C 6/12; F05D 2220/40; F05D 2250/232; F05D 2250/51
See application file for complete search history.

(56) References Cited

U.S. PATENT DOCUMENTS

| | | | |
|---|---|---|---|
| 4,122,668 A | 10/1978 | Chou et al. | |
| 10,393,009 B2 | 8/2019 | Mohtar et al. | |
| 10,465,706 B2 | 11/2019 | Lombard et al. | |
| 10,544,808 B2 | 1/2020 | Mohtar et al. | |
| 10,550,761 B2 * | 2/2020 | Lombard | ............ F04D 29/4206 |
| 10,619,561 B2 * | 4/2020 | Lombard | .............. F04D 29/464 |
| 2014/0308110 A1 * | 10/2014 | Houst | ................... F04D 27/002 415/146 |

(Continued)

FOREIGN PATENT DOCUMENTS

| | | |
|---|---|---|
| DE | 102008028298 A1 | 12/2009 |
| DE | 102010026176 A1 | 1/2012 |

(Continued)

*Primary Examiner* — Jesse S Bogue
(74) *Attorney, Agent, or Firm* — John C. James

(57) ABSTRACT

A turbocharger includes a compressor equipped with an inlet-adjustment mechanism disposed in the air inlet of the compressor, the inlet-adjustment mechanism including a plurality of arcuate blades distributed about a circumference of a circle and partially overlapping one another so as to form an uninterrupted 360-degree blade ring. Each blade is pivotable about a respective fixed pivot point such that the ring is adjustable between a maximum-open position and a minimum-open position, the ring being adjustable via simultaneous coordinated pivoting of the blades about the respective fixed pivot points. The blades are structured and arranged to form said uninterrupted 360-degree blade ring in the maximum-open position and the minimum-open position and any intermediate position therebetween.

14 Claims, 14 Drawing Sheets

(56) References Cited

U.S. PATENT DOCUMENTS

| | | | |
|---|---|---|---|
| 2017/0211707 A1 | 7/2017 | Wakayama et al. | |
| 2019/0048876 A1* | 2/2019 | Mohtar | F04D 27/0207 |
| 2019/0078587 A1* | 3/2019 | Zeng | F04D 27/002 |
| 2020/0208651 A1* | 7/2020 | Bogner | F04D 29/4213 |

FOREIGN PATENT DOCUMENTS

| | | |
|---|---|---|
| DE | 102011121996 B4 | 6/2013 |
| DE | 102012011423 B3 | 11/2013 |
| DE | 102013003418 A1 | 8/2014 |
| GB | 957884 A | 5/1964 |
| JP | 3719337 B2 | 9/2005 |
| WO | 2013074503 A1 | 5/2013 |
| WO | 2016041024 A2 | 3/2016 |

* cited by examiner

TURBOCHARGER COMPRESSOR WITH INLET-ADJUSTMENT MECHANISM HAVING PIVOTING BLADES FORMING ADJUSTABLE UNINTERRUPTED BLADE RING

BACKGROUND OF THE INVENTION

The present disclosure relates to centrifugal compressors, such as used in turbochargers, and more particularly relates to centrifugal compressors in which the effective inlet area or diameter can be adjusted for different operating conditions.

An exhaust gas-driven turbocharger is a device used in conjunction with an internal combustion engine for increasing the power output of the engine by compressing the air that is delivered to the air intake of the engine to be mixed with fuel and burned in the engine. A turbocharger comprises a compressor wheel mounted on one end of a shaft in a compressor housing and a turbine wheel mounted on the other end of the shaft in a turbine housing. Typically, the turbine housing is formed separately from the compressor housing, and there is yet another center housing connected between the turbine and compressor housings for containing bearings for the shaft. The turbine housing defines a generally annular chamber that surrounds the turbine wheel and that receives exhaust gas from an engine. The turbine assembly includes a nozzle that leads from the chamber into the turbine wheel. The exhaust gas flows from the chamber through the nozzle to the turbine wheel and the turbine wheel is driven by the exhaust gas. The turbine thus extracts power from the exhaust gas and drives the compressor. The compressor receives ambient air through an inlet of the compressor housing and the air is compressed by the compressor wheel and is then discharged from the housing to the engine air intake.

Turbochargers typically employ a compressor wheel of the centrifugal (also known as "radial") type because centrifugal compressors can achieve relatively high pressure ratios in a compact arrangement. Intake air for the compressor is received in a generally axial direction at an inducer portion of the centrifugal compressor wheel and is discharged in a generally radial direction at an exducer portion of the wheel. The compressed air from the wheel is delivered to a volute, and from the volute the air is supplied to the intake of an internal combustion engine.

The operating range of the compressor is an important aspect of the overall performance of the turbocharger. The operating range is generally delimited by a surge line and a choke line on an operating map for the compressor. The compressor map is typically presented as pressure ratio (discharge pressure Pout divided by inlet pressure Pin) on the vertical axis, versus corrected mass flow rate on the horizontal axis. The choke line on the compressor map is located at high flow rates and represents the locus of maximum mass-flow-rate points over a range of pressure ratios; that is, for a given point on the choke line, it is not possible to increase the flow rate while maintaining the same pressure ratio because a choked-flow condition occurs in the compressor.

The surge line is located at low flow rates and represents the locus of minimum mass-flow-rate points without surge, over a range of pressure ratios; that is, for a given point on the surge line, reducing the flow rate without changing the pressure ratio, or increasing the pressure ratio without changing the flow rate, would lead to surge occurring. Surge is a flow instability that typically occurs when the compressor blade incidence angles become so large that substantial flow separation arises on the compressor blades. Pressure fluctuation and flow reversal can happen during surge.

In a turbocharger for an internal combustion engine, compressor surge may occur when the engine is operating at high load or torque and low engine speed, or when the engine is operating at a low speed and there is a high level of exhaust gas recirculation (EGR). Surge can also arise when an engine is suddenly decelerated from a high-speed condition. Expanding the surge-free operation range of a compressor to lower flow rates is a goal often sought in compressor design.

SUMMARY OF THE DISCLOSURE

The present disclosure describes a turbocharger with a centrifugal compressor equipped with an inlet-adjustment mechanism that is operable to adjust the effective diameter of the air inlet that leads air into the compressor wheel. During operating conditions that present a risk of surge occurring, the inlet-adjustment mechanism can be operated to reduce the effective diameter of the air inlet, which has the effect of increasing through-flow velocities of the air entering the compressor wheel, thereby reducing compressor blade incidence angles so as to delay the onset of surge to lower flow rates.

In accordance with one embodiment described herein, a turbocharger comprises a turbine housing and a turbine wheel mounted in the turbine housing and connected to a rotatable shaft for rotation therewith, the turbine housing receiving exhaust gas and supplying the exhaust gas to the turbine wheel, and a centrifugal compressor assembly comprising a compressor housing and a compressor wheel mounted in the compressor housing and connected to the rotatable shaft for rotation therewith. The compressor wheel defines an inducer portion, and the compressor housing has an air inlet wall defining an air inlet for leading air generally axially into the compressor wheel. The compressor housing defines an annular space bounded between an upstream wall and a downstream wall spaced axially therefrom, the annular space surrounding the air inlet and being open to the air inlet at a radially inner end of the annular space.

A compressor inlet-adjustment mechanism is disposed in the annular space of the compressor housing, the inlet-adjustment mechanism comprising a plurality of coplanar, arcuate blades distributed about a circumference of a circle and partially overlapping one another so as to form an uninterrupted 360 degree blade ring. Each blade is pivotable about a respective fixed pivot point such that the blade ring is adjustable between a maximum-open position in which an inner diameter of the blade ring has a maximum value and a minimum-open position in which the inner diameter of the blade ring has a minimum value. The blade ring is adjustable via simultaneous coordinated pivoting of the blades about the respective fixed pivot points, and the blades are structured and arranged to form said uninterrupted 360 degree blade ring in the maximum-open position and the minimum-open position and any intermediate position therebetween.

In an embodiment, each of the blades includes a flow-guiding portion at one end of the blade, a lever arm at an opposite end of the blade, and a mounting portion disposed intermediate the lever arm and the flow-guiding portion. The flow-guiding portions of the blades collectively circumscribe and form the inner diameter of the blade ring. The blades entirely reside within the annular space in the maximum-open position of the blade ring. In any of the intermediate and minimum-open positions of the blade ring, the blades pivot radially inwardly from the annular space into the air inlet such that an effective diameter of the air inlet is reduced to that delimited by the inner diameter of the blade ring.

In some embodiments, the blades are at least 5 in number.

In a particular embodiment, the turbocharger further comprises a unison ring surrounding the blades, the unison ring being rotatable about a rotational axis that is substantially coaxial with a rotation axis of the turbocharger. The unison ring has a radially inner periphery and a radially outer periphery, the radially outer periphery defining a plurality of circumferentially spaced notches, one said notch for each said blade. Alternatively the notches can be defined in the radially inner periphery. Each blade is supported by a pivot pin connected to the mounting portion and engaged in a bore in the compressor housing such that the blade pivots about an axis defined by the pivot pin. The mounting portions of the blades are disposed radially inward from the radially inner periphery of the unison ring, the lever arm of each blade including a hook portion that is engaged in a respective one of the notches in the unison ring. Accordingly, rotation of the unison ring imparts pivotal movement to the blades via engagement of the hook portions of the lever arms in the notches in the unison ring.

In an embodiment in which the hook portions of the lever arms engage notches in the radially outer periphery of the unison ring, the mounting portion of each blade can include a support pad on which a downstream face of the unison ring is axially supported.

In one embodiment, the flow-guiding portion of each blade defines an underlying ledge extending radially inwardly from the inner periphery of the unison ring and extending circumferentially toward a distal end of the flow-guiding portion of an adjacent one of the blades, and the distal end of the flow-guiding portion of the adjacent one of the blades defines a stepped portion having an overlying ledge overlapping the underlying ledge. The underlying and overlying ledges are structured and arranged to at least partially overlap one another in all positions of the blade ring, thereby forming said uninterrupted 360 degree blade ring.

In one embodiment, the overlying ledges are respectively disposed adjacent to axially upstream faces of the underlying ledges.

In an embodiment, the blades can collectively define a cylindrical duct extending axially within the annular space in the compressor housing, each blade defining an arcuate duct portion integrally formed on the blade, the duct portions of the blades coming together end-to-end circumferentially about the annular space when the blade ring is adjusted to the minimum-open position so as to form said cylindrical duct. The cylindrical duct, which forms when the blade ring is in the minimum-open position, helps to fluidly isolate the annular space from the compressor inlet and can thereby help to avoid flow perturbation at the wheel inlet that would otherwise be caused by the annular space. In other positions of the blade ring, the duct portions separate from one another and hence do not perform such a sealing function.

In one embodiment, a radially inner peripheral edge of each blade comprises a circular arc, the blades being structured and arranged such that the radially inner peripheral edges of the blades collectively form a substantially circular orifice in the minimum-open position of the blade ring.

In accordance with a particular embodiment, the compressor housing comprises a main housing portion that defines the volute and the contour, and a separately formed cover portion that defines the air inlet, the cover portion being axially received into a receptacle defined by an upstream side of the main housing portion and being affixed to the main housing portion by fasteners, the upstream wall of the annular space being defined by the cover portion and the downstream wall of the annular space being defined by the main housing portion.

The cover portion can define contact pads that confront an upstream face of each of the blades of the inlet-adjustment mechanism and constrain axially upstream movement of the blades.

In an embodiment, the compressor housing defines a diffuser leading from an exducer portion of the compressor wheel to the volute, and the diffuser is a diverging diffuser. The diffuser is defined between an upstream diffuser wall and a downstream diffuser wall, and one of the upstream diffuser wall and the downstream diffuser wall is inclined with respect to a radial direction such that an axial width of the diffuser increases with increasing radius from the rotation axis of the turbocharger. The inclined diffuser wall can be conical.

BRIEF DESCRIPTION OF THE DRAWINGS

Having described the present disclosure in general terms, reference will now be made to the accompanying drawing(s), which are not necessarily drawn to scale, and wherein.

DETAILED DESCRIPTION OF THE DRAWINGS

The present inventions now will be described more fully hereinafter with reference to the accompanying drawings, in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

In the present disclosure, the term "orifice" means "opening" without regard to the shape of the opening. Thus, an "orifice" can be circular or non-circular. Additionally, when the present disclosure refers to the blades collectively forming an "uninterrupted 360-degree blade ring", such language does not necessitate that there is physical contact between adjacent blades.

Figure 1:
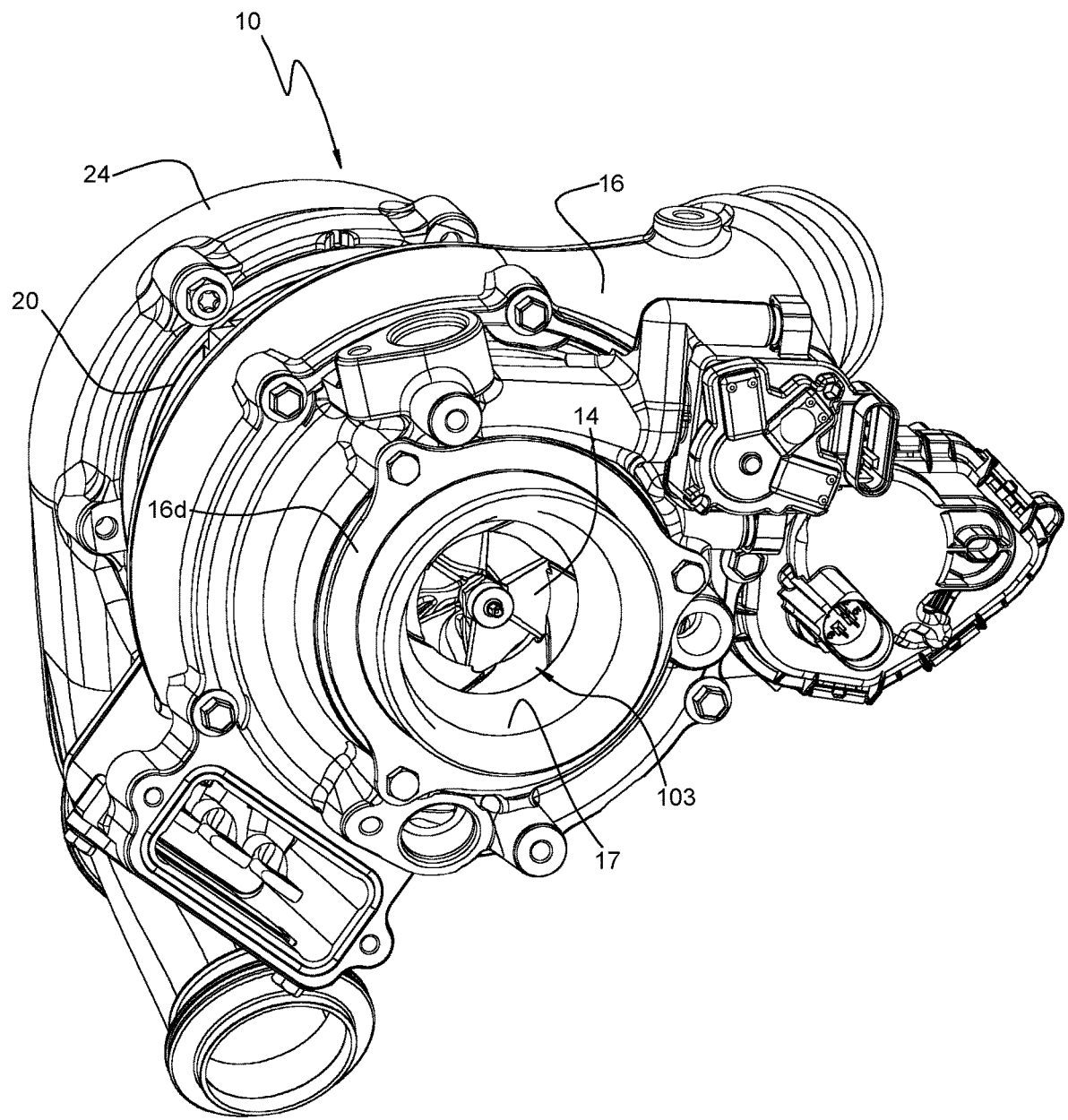
FIG. 1 is an isometric view of a turbocharger in accordance with one embodiment of the invention, as viewed from a compressor end generally toward a turbine end of the turbocharger.
Figure 2:
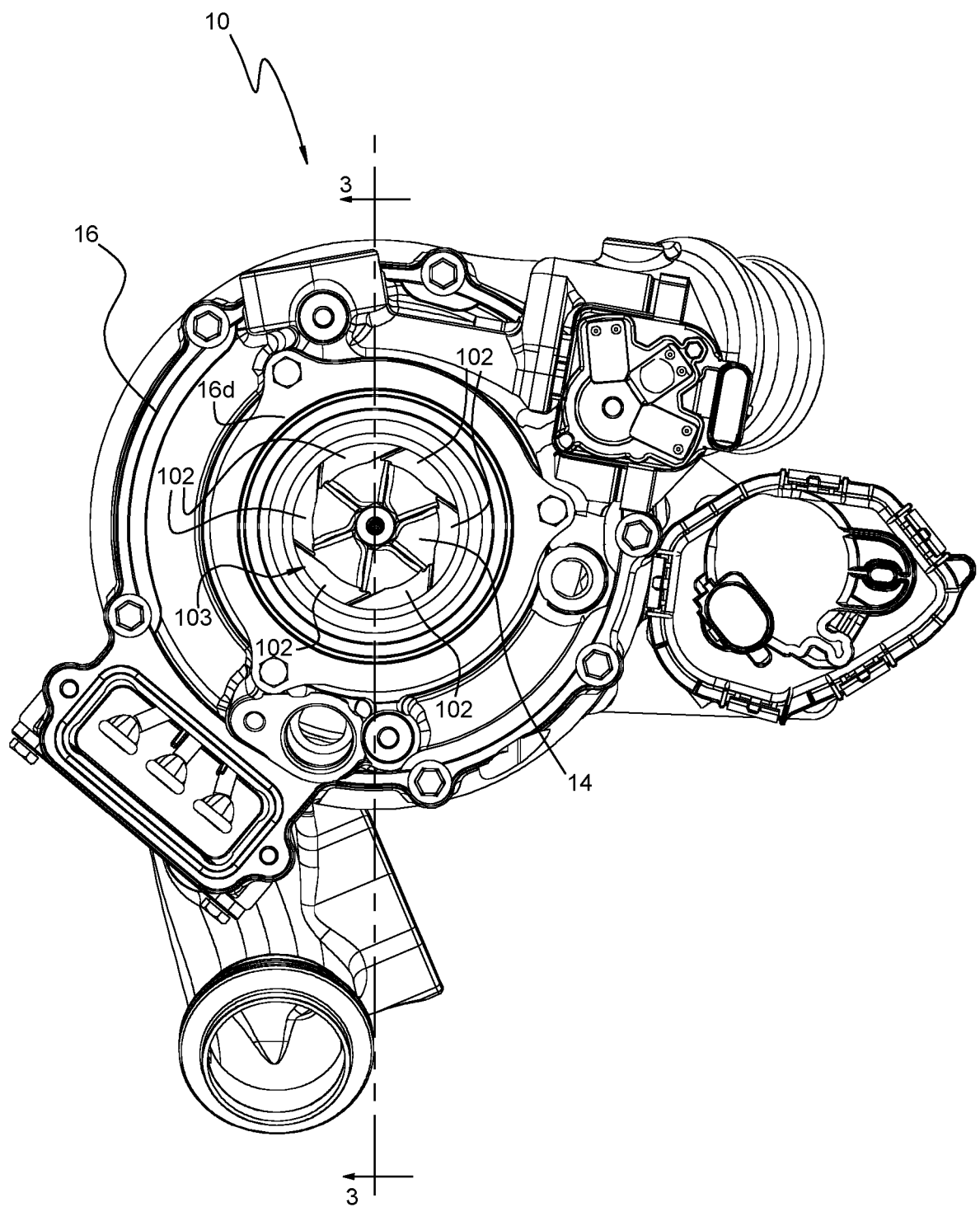
FIG. 2 is an end view of the turbocharger of FIG. 1, as viewed from the compressor end toward the turbine end.
Figure 3:
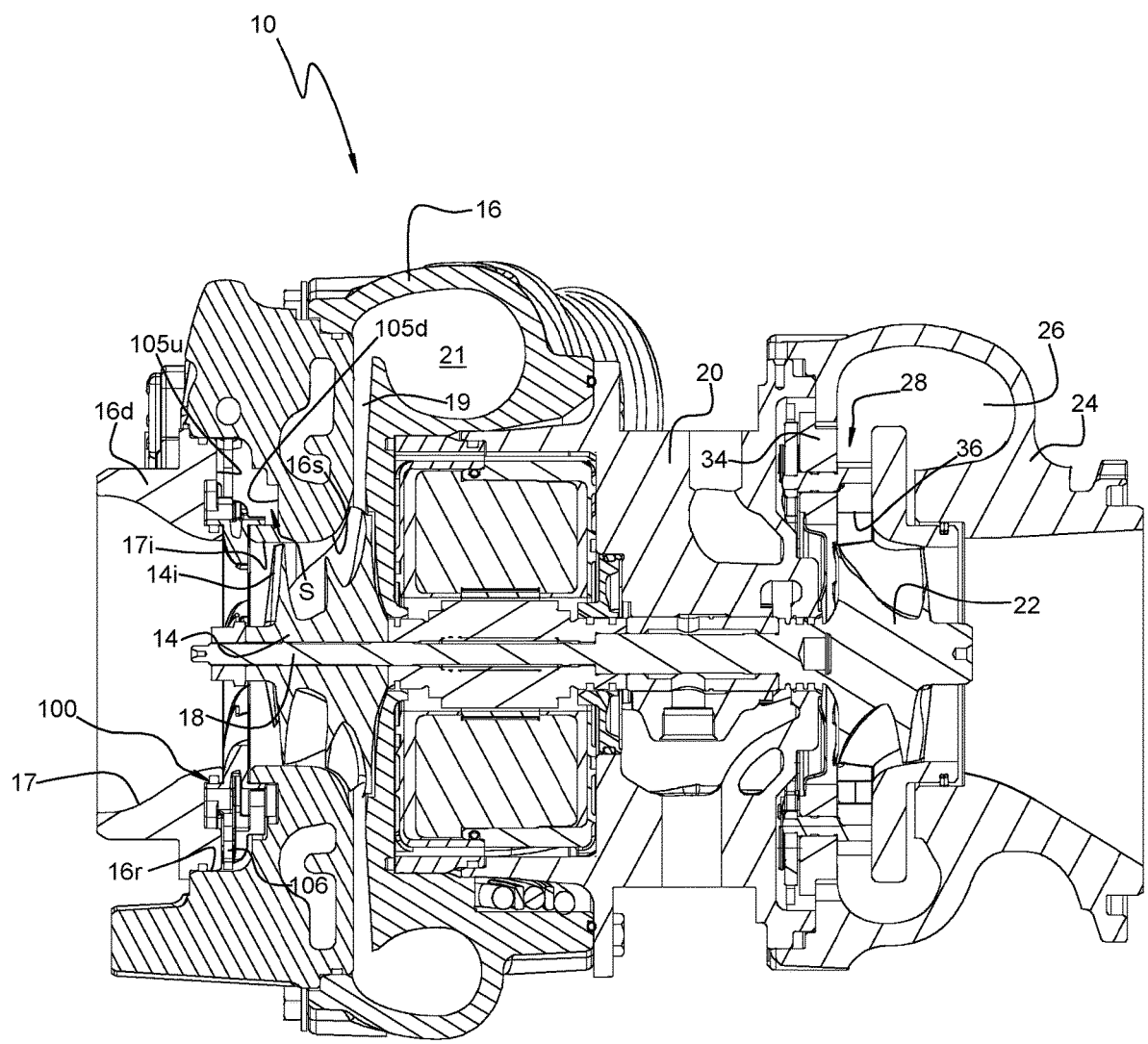
FIG. 3 is a cross-sectional view of the turbocharger along line 2-2 in FIG. 2.

A turbocharger 10 in accordance with one embodiment of the invention is illustrated in FIGS. 1 and 2, and an axial cross-sectional view of the turbocharger is shown in FIG. 3. The turbocharger includes a compressor and a turbine. The compressor comprises a compressor wheel or impeller 14 mounted in a compressor housing 16 on one end of a rotatable shaft 18. The compressor housing includes a wall that defines an air inlet 17 for leading air generally axially into the compressor wheel 14. The shaft is supported in bearings mounted in a center housing 20 of the turbocharger. The shaft is rotated by a turbine wheel 22 mounted on the other end of the shaft from the compressor wheel, thereby rotatably driving the compressor wheel, which compresses air drawn in through the compressor inlet and discharges the compressed air generally radially outwardly from the compressor wheel through a diffuser 19 into a volute 21 for receiving the compressed air. From the volute 21, the air is routed to the intake of an internal combustion engine (not shown) for boosting the performance of the engine.

The turbine wheel 22 is disposed within a turbine housing 24 that defines an annular chamber 26 for receiving exhaust gases from an internal combustion engine (not shown). The turbine housing also defines a nozzle 28 for directing exhaust gases from the chamber 26 generally radially inwardly to the turbine wheel 22. In the illustrated embodiment, the nozzle is a variable nozzle having a nozzle ring 34 on which an array of circumferentially spaced pivotable vanes 36 is supported. Exhaust gas flow through the nozzle is regulated by adjusting the positions of the vanes 36. The exhaust gases are expanded as they pass through the turbine wheel, and rotatably drive the turbine wheel, which in turn rotatably drives the compressor wheel 14 as already noted.

With reference to FIGS. 1-4, in the illustrated embodiment, the wall that defines the air inlet 17 for the compressor is formed in part by the compressor housing 16 (also referred to herein as the "main housing portion") and in part by a separate inlet duct member 16d (also referred to herein as the "cover portion") that is received into a cylindrical receptacle 16r defined by the compressor housing. The portion of the air inlet 17 proximate the compressor wheel 14 defines a generally cylindrical inner surface 17i that has a diameter generally matched to the diameter of an inducer portion 14i of the compressor wheel.

The compressor housing 16 defines a shroud surface 16s that is closely adjacent to the radially outer tips of the impeller blades. The shroud surface defines a curved contour that is generally parallel to the contour of the compressor wheel.

In the illustrated embodiment, the diffuser 19 leading from the exducer portion of the compressor wheel 14 to the volute 21 is a diverging diffuser whose axial width increases with increasing radius from the rotation axis of the turbocharger. The diffuser is defined between an upstream diffuser wall and a downstream diffuser wall, and one of the upstream and downstream diffuser walls is inclined with respect to a radial direction to create the diverging diffuser. The inclined diffuser wall can be conical. The downstream diffuser wall is inclined in the illustrated embodiment, but alternatively the upstream wall can be inclined.

In accordance with the invention, the compressor of the turbocharger includes an inlet-adjustment mechanism 100 disposed in the air inlet 17 of the compressor housing. The inlet-adjustment mechanism comprises a ring-shaped assembly and is disposed in an annular space S defined between a downstream wall 105d defined by the main housing portion 16 and an upstream wall 105u defined by the separate cover portion 16d. The inlet-adjustment mechanism is operable for adjusting an effective diameter of the air inlet into the compressor wheel. As such, the inlet-adjustment mechanism is movable between a maximum-open position and a minimum-open position, and one or more intermediate-open positions between said maximum- and minimum-open positions.

Figure 4:
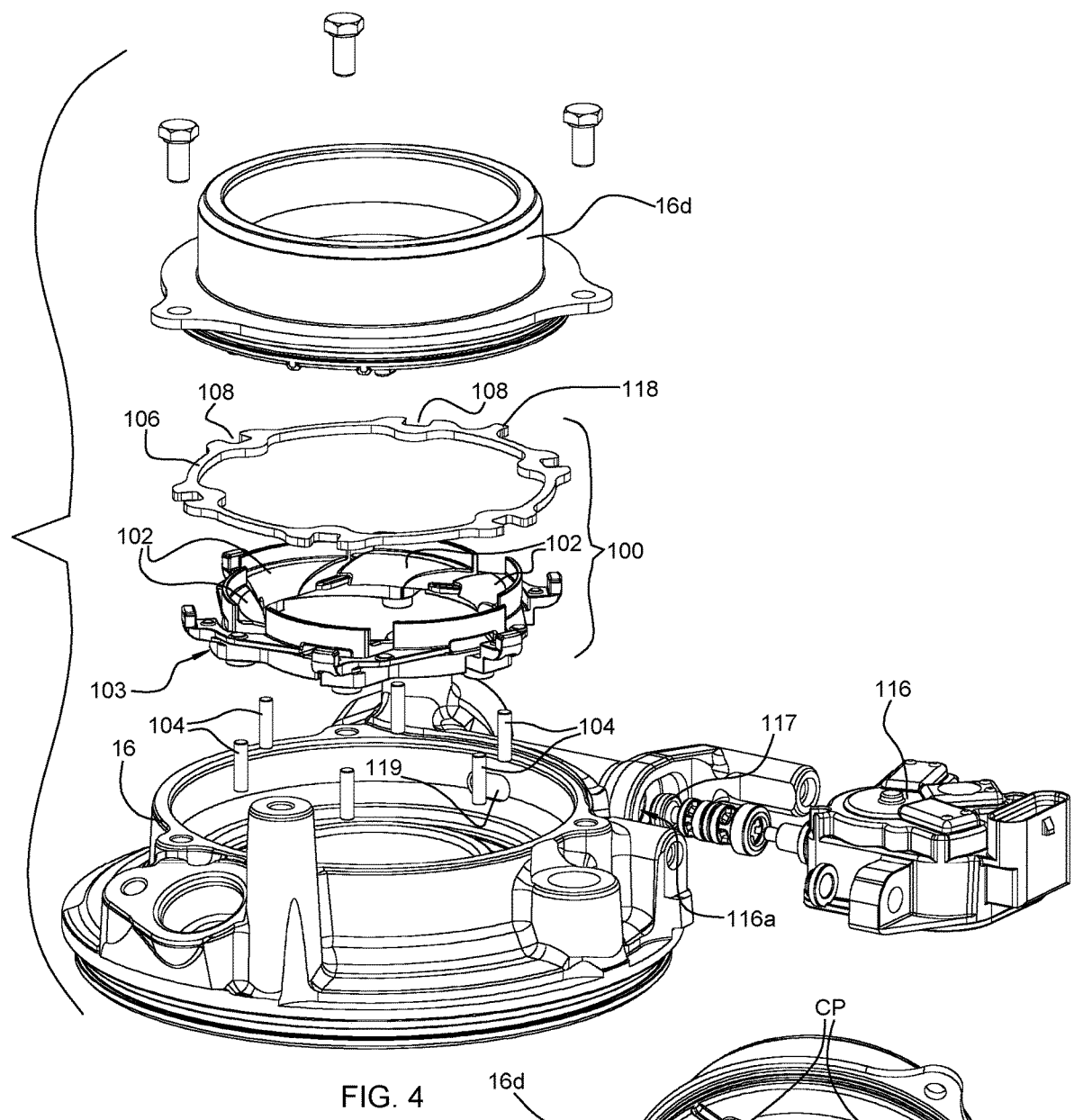
FIG. 4 is an exploded view of a sub-assembly of the turbocharger comprising a compressor housing and an inlet-adjustment mechanism for installation therein.

With reference now to FIGS. 3 and 4, the inlet-adjustment mechanism comprises a plurality of blades 102 arranged about the central axis of the air inlet and each pivotable about a pivot pin 104 located at or near one end of the blade. The assembly of the blades 102 forms an uninterrupted 360-degree blade ring 103 whose inner diameter is adjustable via pivoting of the blades about the pivot pins.

Figure 5:
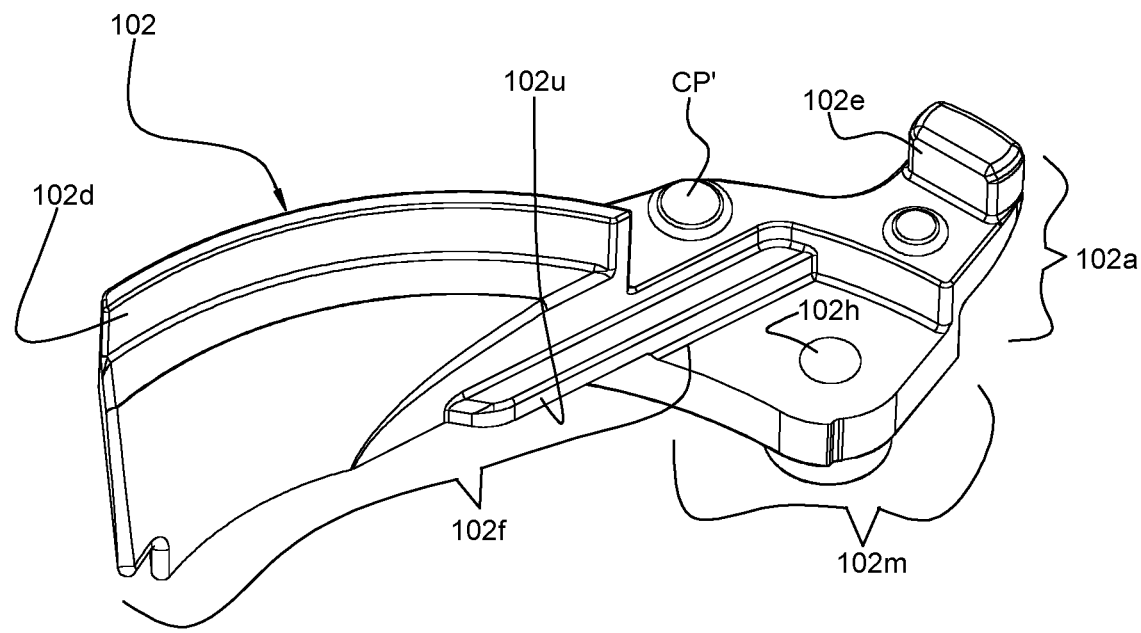
FIG. 5 is an isometric view of a blade of the inlet-adjustment mechanism in accordance with an embodiment of the invention.
Figure 6:
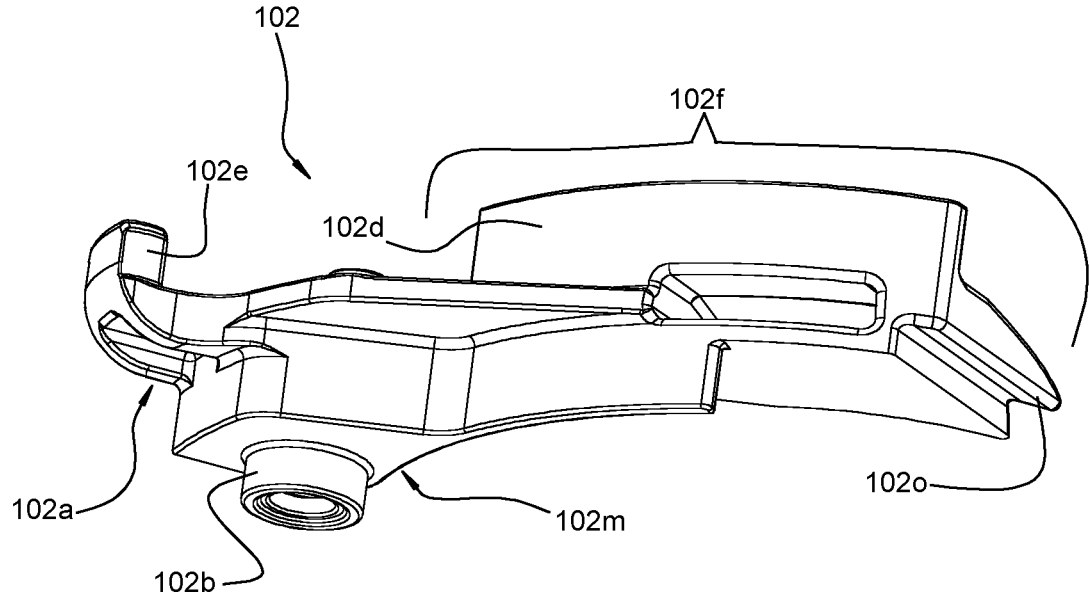
FIG. 6 is a further isometric view of the blade of FIG. 5.

With additional reference to FIGS. 5 and 6, each of the blades 102 includes a flow-guiding portion 102f at one end of the blade, a lever arm 102a at an opposite end of the blade, and a mounting portion 102m disposed intermediate the lever arm and the flow-guiding portion. The flow-guiding portions 102f of the blades collectively circumscribe and form the inner diameter of the blade ring. In the maximum-open position, the blades entirely reside within the annular space S (FIG. 3), and hence the inlet-adjustment mechanism does not alter the effective inlet diameter of the compressor, i.e., the inlet diameter is that dictated by the inlet surface 17i of the compressor housing immediately in front of the compressor wheel. In the intermediate-open and minimum-open positions, the blade ring 103 creates an orifice that is smaller in diameter than that of the inlet surface 17i and thereby reduces the effective inlet diameter relative to the nominal diameter, as further described below.

In the illustrated embodiment, the pivot pins 104 for the blades are secured in bores defined in the downstream wall 105d of the main housing portion 16 and are received in holes 102h formed in the mounting portion of each blade. The blades are arranged to rest against the downstream wall 105d. A boss 102b surrounding the hole 102h projects from the downstream face of each blade and engages the downstream wall 105d so as to space the majority of the blades from the wall to minimize frictional forces on the blades. The inlet-adjustment mechanism further includes a unison ring 106 that surrounds the assembly of the blades 102 and is substantially coplanar with the blades. In the illustrated embodiment, the radially outer periphery of the unison ring defines a plurality of slots or notches 108, equal in number to the number of blades 102. The lever arm 102a of each blade extends past the radially inner periphery to the radially outer periphery of the unison ring and includes an end or hook portion 102e that engages one of the slots 108, so that when the unison ring is rotated about its axis, the blades are pivoted about the pivot pins 104 so as to adjust the size of the orifice created by the blade ring 103. In a non-illustrated alternative embodiment, the notches for the blade lever arms are defined in the radially inner periphery of the unison ring.

The radially inner edges of the flow-guiding portions 102f of the blades include portions that preferably are circular arc-shaped and these edges collectively surround and bound a generally circular orifice when the blade ring is in the minimum-open position.

Figure 4A:
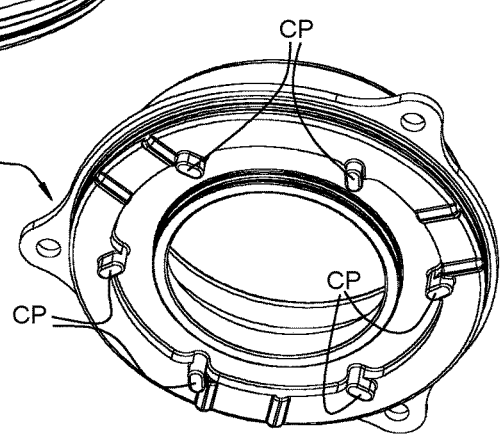
FIG. 4A is an isometric view of the cover portion, showing a side of the cover portion that confronts the inlet-adjustment mechanism.
Figure 9:
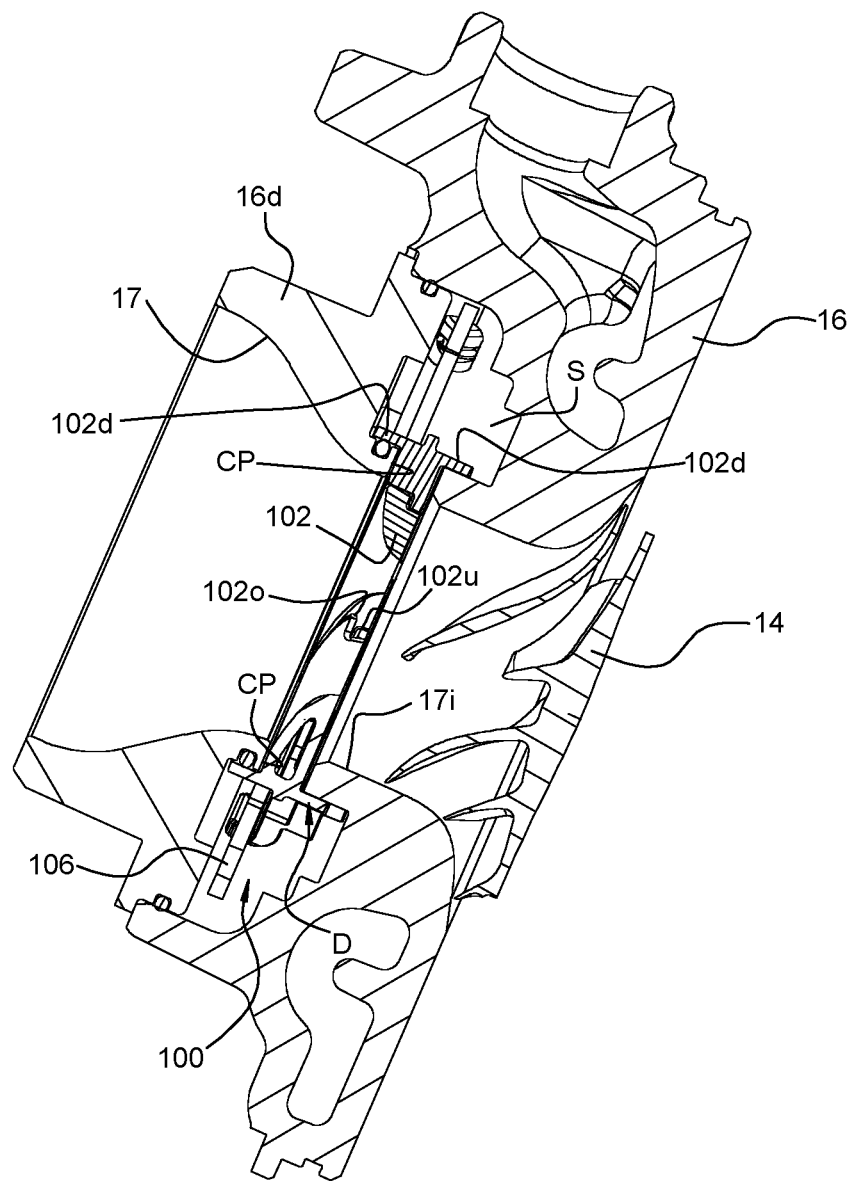
FIG. 9 is a cross-sectional view along line 9-9 in FIG. 8.

As shown in FIG. 4A, the cover portion 16d in the illustrated embodiment defines contact pads CP that confront an upstream face of each of the blades 102 of the inlet-adjustment mechanism and constrain axially upstream movement of the blades (see FIG. 9). Correspondingly, each blade includes a contact pad CP' for contacting a respective one of the contact pads of the cover portion, as shown in FIG. 5.

In an alternative embodiment (not shown), the inlet-adjustment mechanism can be provided in a cartridge form that includes two annular end plates between which the blades and unison ring are captively retained, and the whole assembly can be mounted within the annular space in the compressor housing. In this case, the pivot pins 104 for the blades 102 can secured in one of the end plates.

Figure 8:
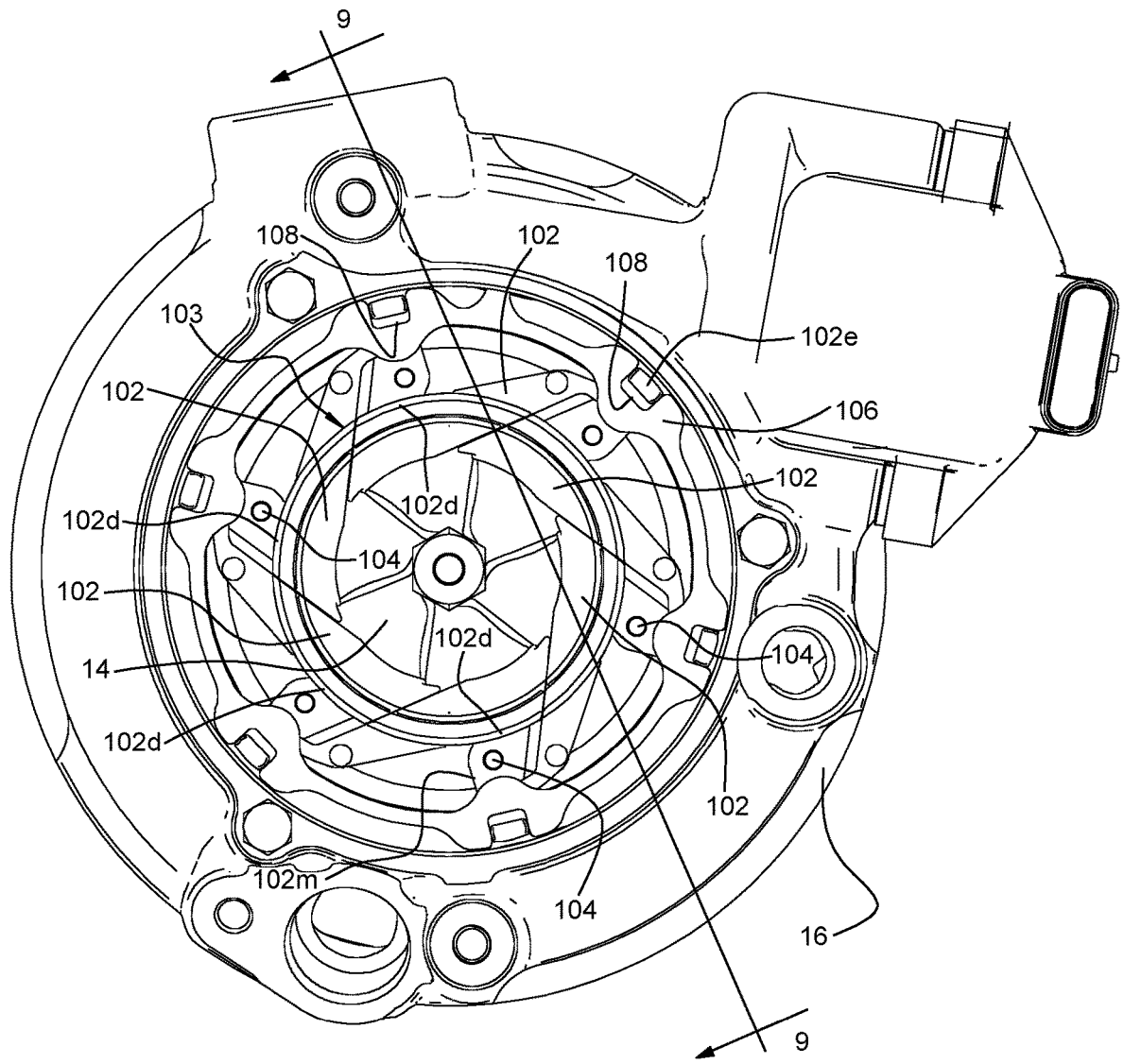
FIG. 8 is an end view of the compressor of FIG. 7, with the cover portion of the compressor housing removed to reveal details of the inlet-adjustment mechanism.
Figure 14:
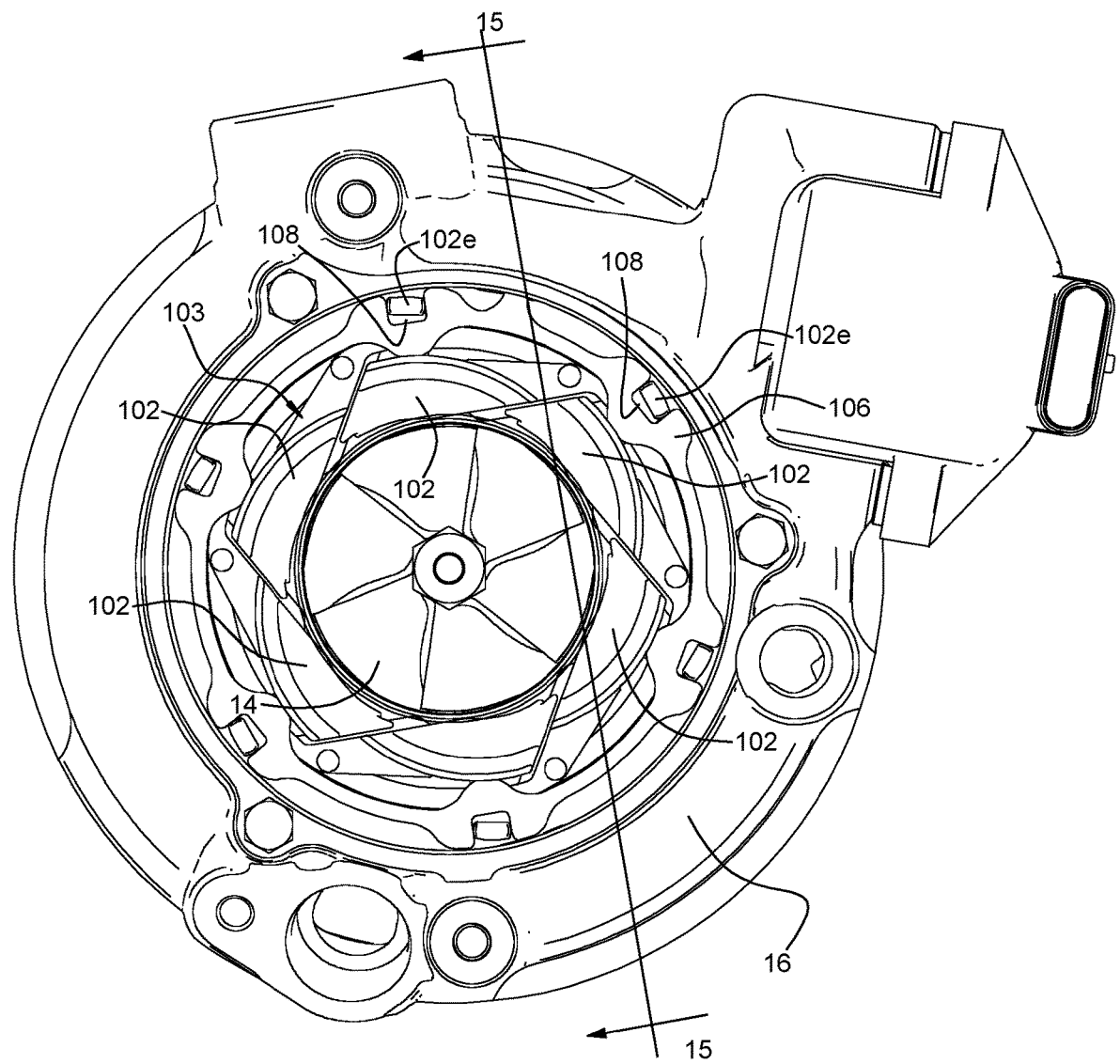
FIG. 14 is an end view of the compressor of FIG. 13, with the cover portion of the compressor housing removed to reveal details of the inlet-adjustment mechanism.
Figure 15:
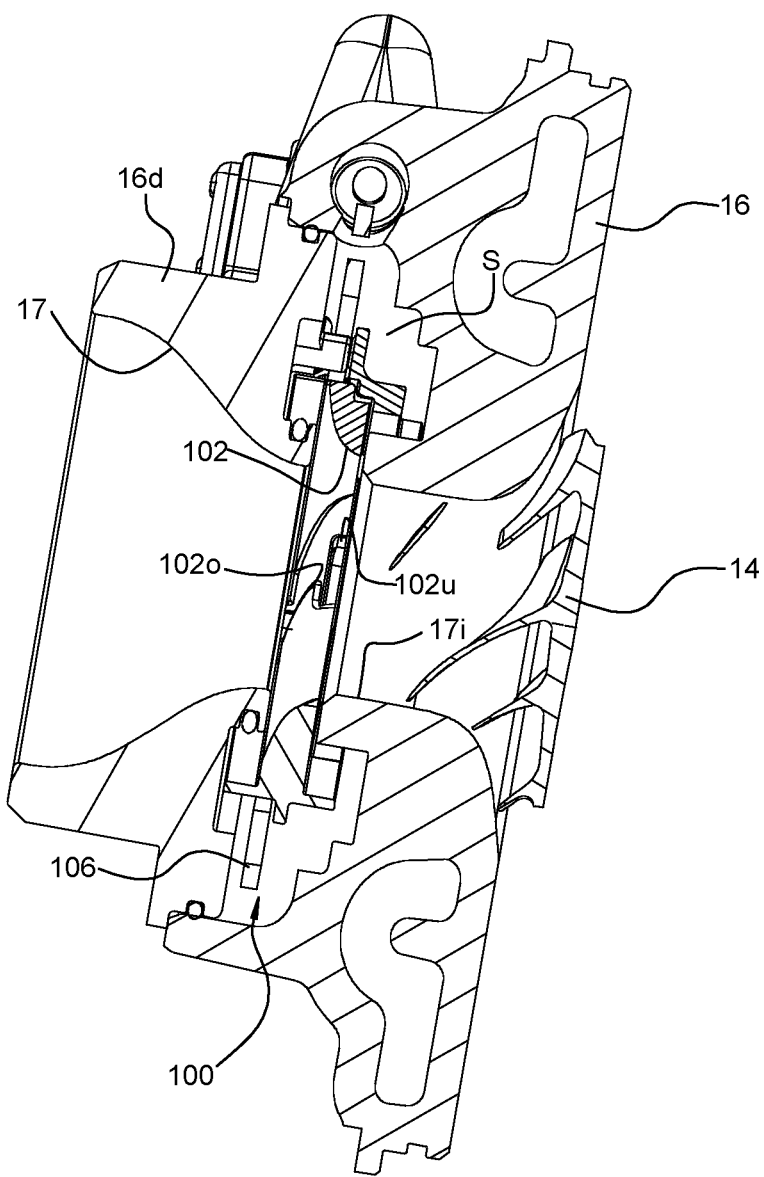
FIG. 15 is a cross-sectional view along line 15-15 in FIG. 14.

The range of pivotal movement of the blades is sufficient that the blades can be pivoted radially outwardly (by rotation of the unison ring in one direction, clockwise in FIG. 8) to a maximum-open position as shown in FIG. 14, in which the blades are entirely radially outward of the inner surface 17i of the inlet. As previously noted, in the maximum-open position of the blades, the inlet-adjustment mechanism does not alter the nominal inlet diameter as defined by the inlet surface 17i.

Figure 10:
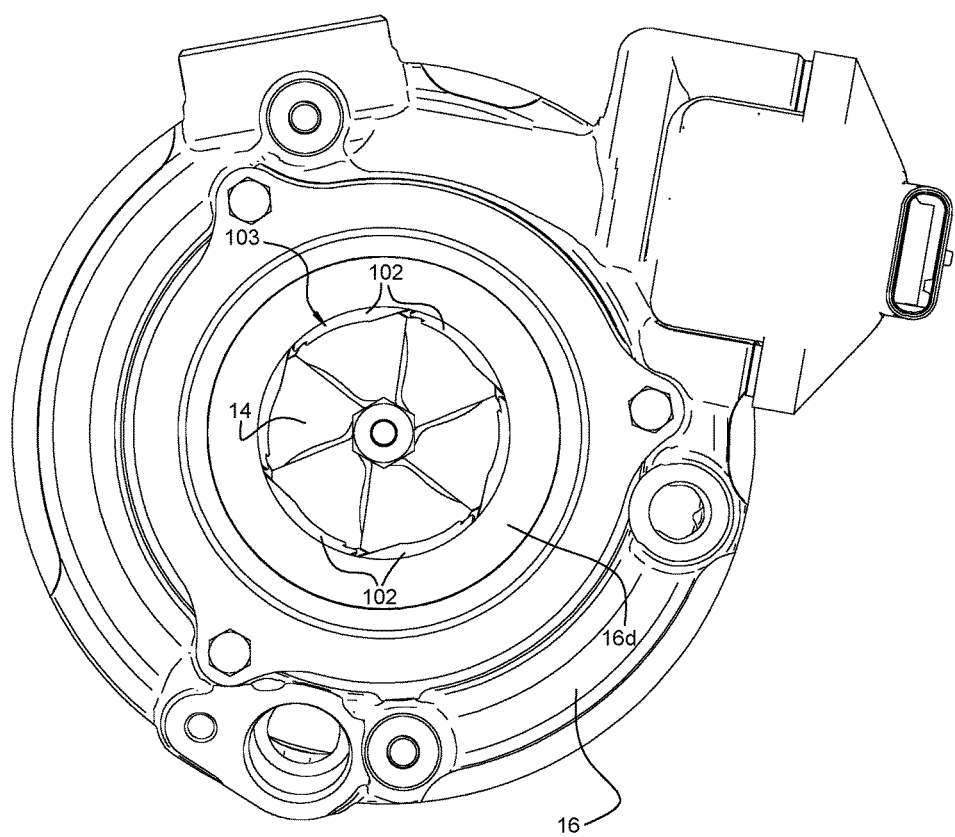
FIG. 10 is an end view of the compressor of FIG. 7, showing the inlet-adjustment mechanism in an intermediate-open position.
Figure 11:
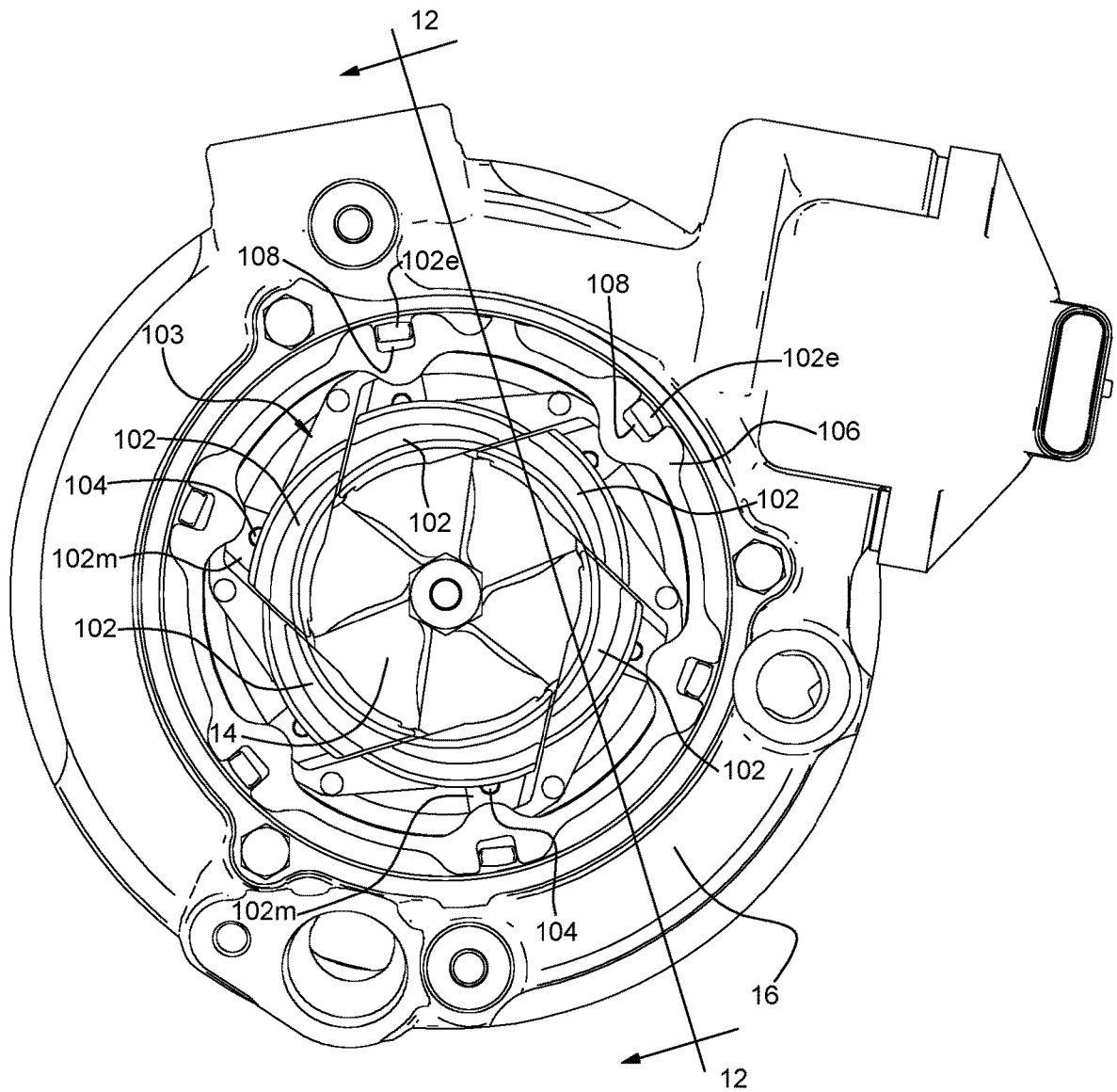
FIG. 11 is an end view of the compressor of FIG. 10, with the cover portion of the compressor housing removed to reveal details of the inlet-adjustment mechanism.
Figure 12:
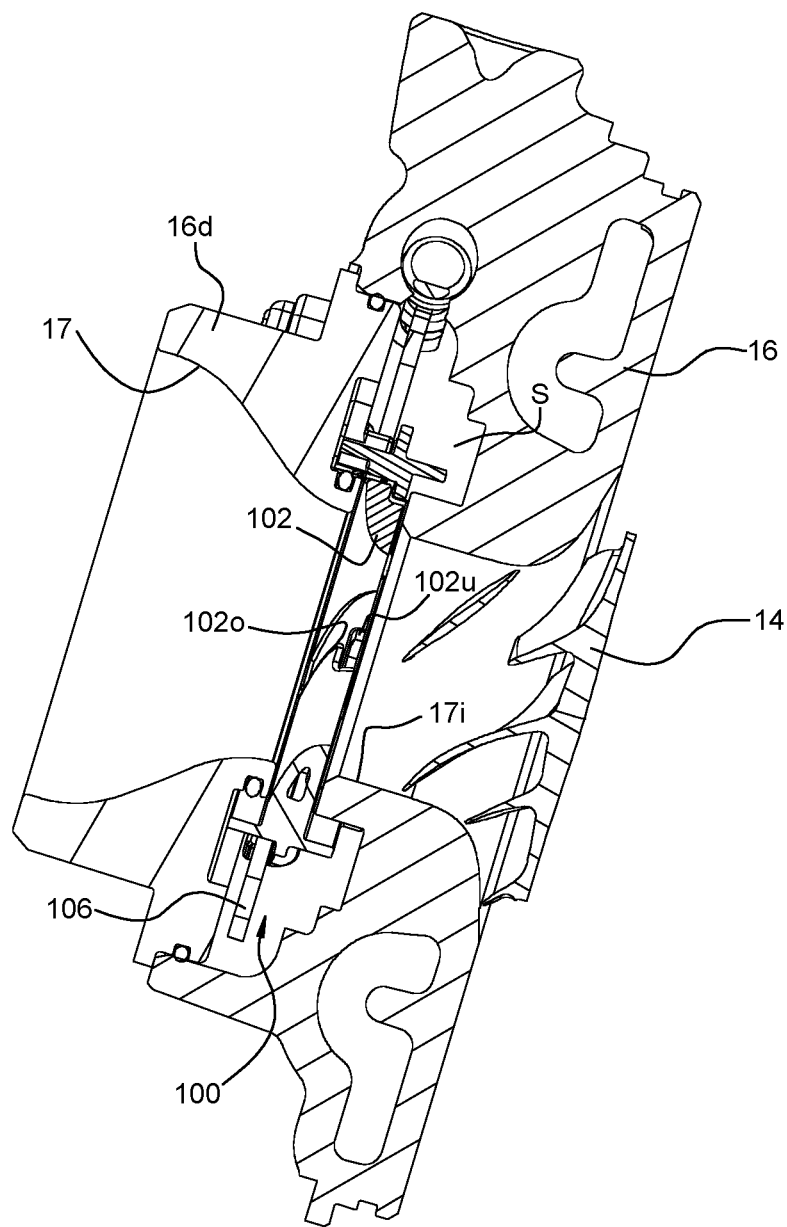
FIG. 12 is a cross-sectional view along line 12-12 in FIG. 11.

The blades can also be pivoted radially inwardly (by rotation of the unison ring in the opposite direction, counterclockwise in FIG. 14) to a minimum-open position as shown in FIG. 8. In the minimum-open position, the circular-arc edges along the radially inner sides of the blades collectively form an orifice that is substantially a circle having a diameter that is less than that of the inlet surface 17i. This has the consequence that the effective diameter of the inlet is reduced relative to the nominal inlet diameter. Furthermore, in the illustrated embodiment the blades can be pivoted to at least one intermediate-open position as shown in FIGS. 10 and 11. In the intermediate-open position, the blade ring 103 delimits an orifice whose diameter is greater than that of the minimum-open position, but still smaller than that of the inlet surface 17i.

It is a feature of the present invention that in all positions of the blade ring 103, the blades 102 collectively form an uninterrupted 360-degree blade ring. This is accomplished by the number, structure, and arrangement of the blades 102, as well as the location of their pivot pins 104 relative to other portions of the blade, as further described below. Thus, with reference to FIGS. 5 and 6, a proximal end of the flow-guiding portion 102f of each blade (the terms "proximal" and "distal" being with respect to the location of the pivot pin 104 for the blade) defines an underlying ledge 102u extending from a point adjacent the hole 102h for the pivot pin, toward a distal end of the flow-guiding portion (i.e., along a direction generally radially inwardly when the blade is installed as part of the blade ring 103). The underlying ledge 102u also extends circumferentially toward a distal end of the flow-guiding portion of an adjacent one of the blades. Correspondingly, the distal end of the flow-guiding portion of said adjacent one of the blades defines a stepped portion having an overlying ledge 102o overlapping said underlying ledge 102u of the first blade. The underlying and overlying ledges are structured and arranged to at least partially overlap one another in all positions of the blade ring, thereby forming said uninterrupted 360-degree blade ring (see the maximum-open position in FIG. 14, illustrating how the overlap remains). In the illustrated embodiment, the overlying ledges 102o are respectively disposed adjacent to axially upstream faces of the underlying ledges 102u. This ability of the blades to form an uninterrupted blade ring in all positions depends in part on the number of blades. Preferably there are at least 5 blades; the illustrated embodiment employs 6 blades, but a greater number of blades can be used if desired.

In the illustrated embodiment, each of the blades 102 defines an arcuate duct portion 102d integrally formed on the blade. The duct portions 102d of the blades come together end-to-end circumferentially about the annular space S in the compressor housing when the blade ring 103 is adjusted to the minimum-open position (FIG. 8) so as to form a cylindrical duct D extending axially within the annular space in the compressor housing, adjacent a radially inner end of the annular space (FIG. 9). The cylindrical duct, which forms only when the blade ring is in the minimum-open position, helps to fluidly isolate the annular space from the compressor inlet and can thereby help to avoid flow perturbation at the wheel inlet that would otherwise be caused by the annular space. In other positions of the blade ring, the duct portions separate from one another and hence do not perform such a sealing function.

As previously described, the blades 102 are actuated to pivot between their maximum-open, minimum-open, and intermediate-open positions by the unison ring 106 that is rotatable about the center axis of the air inlet. Referring now to FIG. 4, rotational motion is imparted to the unison ring by an actuator 116. An actuator rod 117 of the actuator is received into a receptacle 116a defined in the compressor housing 16. The actuator includes that extends through a space defined in the compressor housing and is affixed at its distal end to an arm 118 that projects radially outwardly from the unison ring through a slot 119 extending through a wall of the compressor housing. The actuator is operable to extend and retract the rod 117 linearly along its length direction so as to rotate the unison ring 106 and thereby actuate the blades 102. Extending the rod pivots the blades towards the minimum-open position and retracting the rod pivots the blades toward the maximum-open position.

Figure 7:
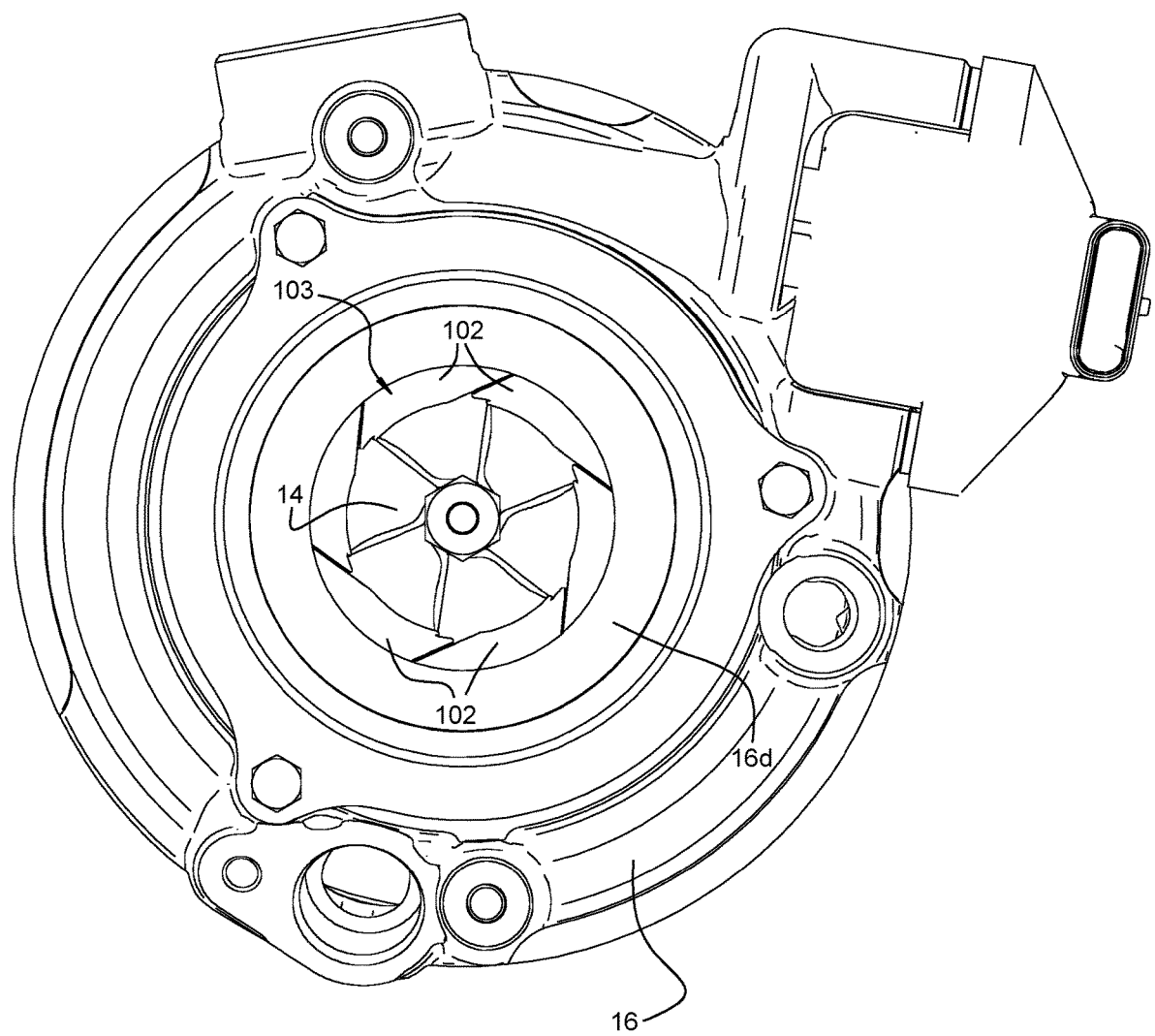
FIG. 7 is an end view of a compressor in accordance with an embodiment of the invention, showing the inlet-adjustment mechanism in a minimum-open position.

As noted, the inlet-adjustment mechanism 100 enables adjustment of the effective size or diameter of the inlet into the compressor wheel 14. As illustrated in FIGS. 7 and 8, when the inlet-adjustment mechanism is in the minimum-open position, the effective diameter of the inlet into the compressor wheel is dictated by the inside diameter defined by the blade ring 103. In order for this effect to be achieved, the axial spacing should be optimized for the particular compressor wheel so that the inlet diameter is effectively reduced to a value that is dictated by the blade ring, while avoiding unacceptable noise levels.

At low flow rates (e.g., low engine speeds), the inlet-adjustment mechanism 100 can be placed in the minimum-open position of FIGS. 7 and 8. This can have the effect of reducing the effective inlet diameter and thus of increasing the flow velocity into the compressor wheel. The result will be a reduction in impeller blade incidence angles, effectively stabilizing the flow (i.e., making impeller blade stall and compressor surge less likely). In other words, the surge line of the compressor will be moved to lower flow rates (to the left on a map of compressor pressure ratio versus flow rate).

Figure 13:
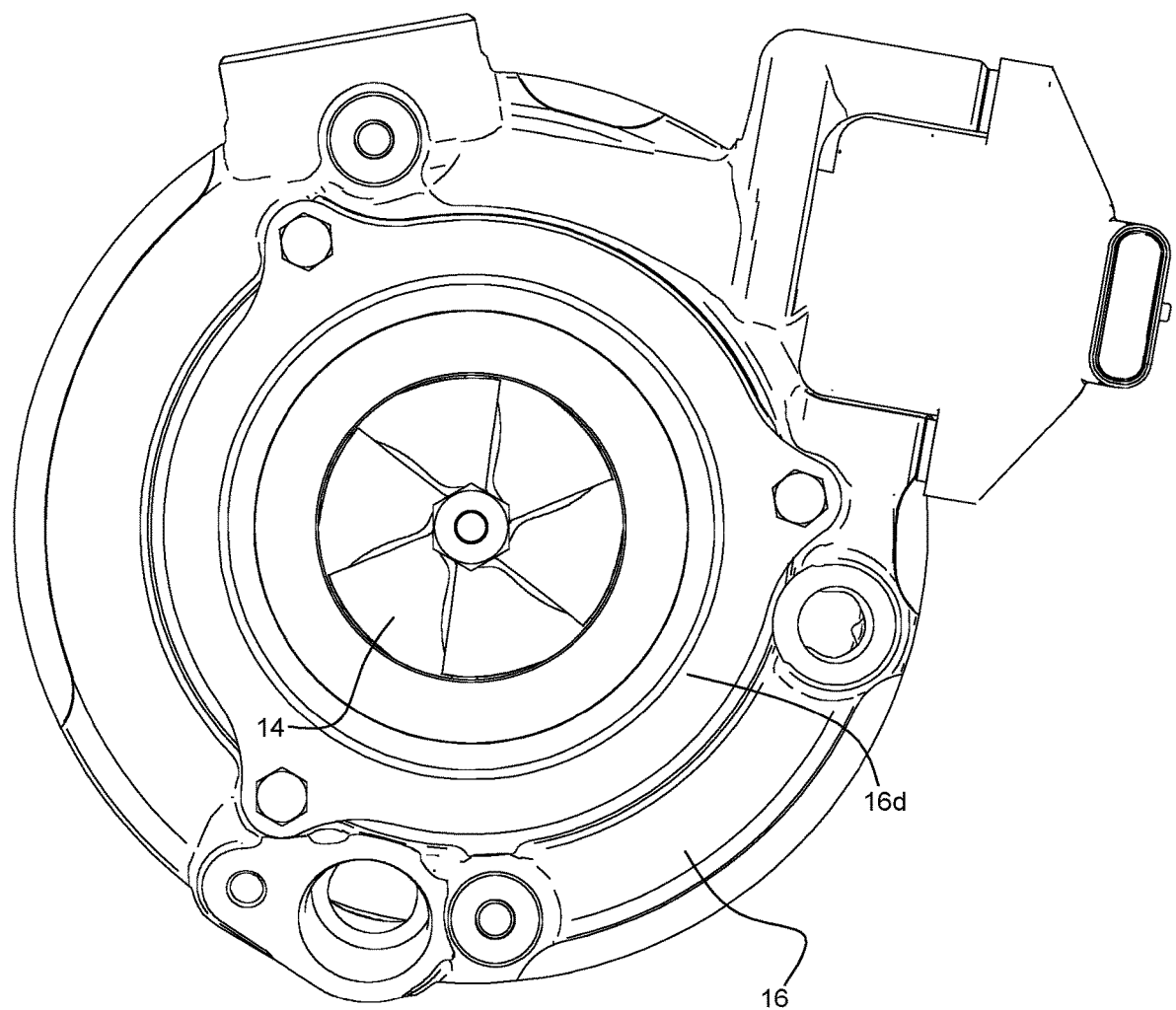
FIG. 13 is an end view of the compressor of FIG. 7, showing the inlet-adjustment mechanism in a maximum-open position.

At intermediate and high flow rates, the inlet-adjustment mechanism 100 can be adjusted to the maximum-open position as in FIGS. 13 and 14. This can have the effect of increasing the effective inlet diameter so that the compressor regains its high-flow performance and choke flow essentially as if the inlet-adjustment mechanism were not present and as if the compressor had a conventional inlet matched to the wheel diameter at the inducer portion of the wheel.

For other operating conditions, it may be advantageous to place the mechanism in an intermediate-open position such as in FIGS. 10 and 11. The intermediate position(s) can be advantageous, for example, when transiently moving from low-flow to high-flow conditions, wherein the blade ring can be transitioned from the minimum-open position to one or more intermediate-open positions on the way to being fully opened to the maximum-open position. In this way, an abrupt change from minimum- to maximum-open position can be avoided. It is to be noted that an advantage of the inlet-adjustment mechanism in accordance with the invention, in which the number of blades is preferably at least 5, is that the shape of the orifice created by the blades in the intermediate position can be substantially circular, which is beneficial for performance of the compressor. The relatively large number of blades is further beneficial in reducing leakage through the mechanism.

Persons skilled in the art, on the basis of the present disclosure, will recognize that modifications and other embodiments of the inventions described herein can be made without departing from the inventive concepts described herein. Specific terms used herein are employed for explanatory purposes rather than purposes of limitation. Accordingly, the inventions are not to be limited to the specific embodiments disclosed, and modifications and other embodiments are intended to be included within the scope of the appended claims.

What is claimed is:

1. A turbocharger comprising:
a turbine housing and a turbine wheel mounted in the turbine housing and connected to a rotatable shaft for rotation therewith, the turbine housing receiving exhaust gas and supplying the exhaust gas to the turbine wheel;
a centrifugal compressor assembly comprising a compressor housing and a compressor wheel mounted in the compressor housing and connected to the rotatable shaft for rotation therewith, the compressor wheel comprising impeller blades and defining an inducer portion, the compressor housing having an air inlet wall defining an air inlet for leading air generally axially into the compressor wheel, the compressor housing further defining a contour disposed adjacent to radially outer tips of the impeller blades and defining a volute for receiving compressed air discharged generally radially outwardly from the compressor wheel, the compressor housing defining an annular space bounded between an upstream wall and a downstream wall spaced axially therefrom, the annular space surrounding the air inlet and being open to the air inlet at a radially inner end of the annular space; and
a compressor inlet-adjustment mechanism disposed in the annular space of the compressor housing, the inlet-adjustment mechanism comprising a plurality of coplanar, arcuate blades distributed about a circumference of a circle and partially overlapping one another so as to form an uninterrupted 360 degree blade ring, wherein each blade includes a flow-guiding portion at one end of the blade, a lever arm at an opposite end of the blade, and a mounting portion disposed intermediate the lever arm and the flow-guiding portion, the mounting portions of the blades defining respective fixed pivot points for the blades about which the blades are pivotable such that the blade ring is adjustable between a maximum-open position in which an inner diameter of the blade ring has a maximum value and a minimum-open position in which the inner diameter of the blade ring has a minimum value, the blade ring being adjustable via simultaneous coordinated pivoting of the blades about the respective fixed pivot points, the flow-guiding portions of the blades collectively circumscribing and forming the inner diameter of the blade ring, the blades entirely residing within the annular space in the maximum-open position of the blade ring, the blades pivoting radially inwardly from the annular space into the air inlet when the blade ring is in any of the intermediate- and minimum-open positions such that an effective diameter of the air inlet is reduced to that delimited by the inner diameter of the blade ring, and wherein the blades are structured and arranged to form said uninterrupted 360 degree blade ring in the maximum-open position and the minimum-open position and any intermediate-open position therebetween.

2. The turbocharger of claim 1, wherein the blades are at least 5 in number.

3. The turbocharger of claim 2, further comprising:
a unison ring surrounding the blades, the unison ring being rotatable about a rotational axis that is substantially coaxial with a rotation axis of the turbocharger, the unison ring defining a plurality of circumferentially spaced notches defined in one of a radially inner periphery and a radially outer periphery of the unison ring, one said notch for each said blade,
each blade being supported by a pivot pin connected to the mounting portion and engaged in a bore in the compressor housing such that the blade pivots about an axis defined by the pivot pin, the mounting portions of the blades being disposed radially inward from the radially inner periphery of the unison ring, the lever arm of each blade including a hook portion at a radially outer end of the lever arm that is engaged in a respective one of the notches in the unison ring,
whereby rotation of the unison ring imparts pivotal movement to the blades via engagement of the hook portions of the lever arms in the notches in the unison ring.

4. The turbocharger of claim 3, wherein the notches are defined in the radially outer periphery of the unison ring.

5. The turbocharger of claim 4, the mounting portion of each blade including a support pad on which a downstream face of the unison ring is axially supported.

6. The turbocharger of claim 3, wherein a proximal end of the flow-guiding portion of each blade defines an underlying ledge extending radially inwardly from the inner periphery of the unison ring and extending circumferentially toward a distal end of the flow-guiding portion of an adjacent one of the blades, and wherein the distal end of the flow-guiding portion of said adjacent one of the blades defines a stepped portion having an overlying ledge overlapping said underlying ledge, and wherein said underlying and overlying ledges are structured and arranged to at least partially overlap one another in all positions of the blade ring, thereby forming said uninterrupted 360-degree blade ring.

7. The turbocharger of claim 6, wherein said overlying ledges are respectively disposed adjacent to axially upstream faces of said underlying ledges.

8. The turbocharger of claim 6, each blade defining an arcuate duct portion integrally formed on the blade, the duct portions of the blades coming together end-to-end circumferentially about the annular space when the blade ring is adjusted to the minimum-open position so as to form a cylindrical duct adjacent the radially inner end of the annular space in the compressor housing and extending axially within the annular space.

9. The turbocharger of claim 6, wherein a radially inner peripheral edge of each blade comprises a circular arc, the blades being structured and arranged such that the radially inner peripheral edges of the blades collectively form a substantially circular orifice in the minimum-open position of the blade ring.

10. The turbocharger of claim 6, wherein the compressor housing comprises a main housing portion that defines the volute and the contour, and a separately formed cover portion that defines the air inlet, the cover portion being axially received into a receptacle defined by an upstream side of the main housing portion and being affixed to the main housing portion by fasteners, the upstream wall of the annular space being defined by the cover portion and the downstream wall of the annular space being defined by the main housing portion.

11. The turbocharger of claim 10, wherein the cover portion defines contact pads that confront an upstream face of the blades of the inlet-adjustment mechanism and constrain axially upstream movement of the blades.

12. The turbocharger of claim 11, wherein the compressor housing defines a diffuser leading from an exducer portion of the compressor wheel to the volute, and wherein the diffuser is a diverging diffuser.

13. The turbocharger of claim 12, wherein the diffuser is defined between an upstream diffuser wall and a downstream diffuser wall, and the upstream diffuser wall is inclined with respect to a radial direction such that an axial width of the diffuser increases with increasing radius from the rotation axis of the turbocharger.

14. The turbocharger of claim 13, wherein the upstream diffuser wall is conical.

\* \* \* \* \*